(12) United States Patent
Uchida (10) Patent No.: US 6,371,300 B1
(45) Date of Patent: Apr. 16, 2002

(54) OPTICAL DISC CASE (75) Inventor: Hiromichi Uchida, Tokyo (JP)

(73) Assignee: Toyo Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/589,289

(22) Filed: Jun. 8, 2000

Related U.S. Application Data (63) Continuation-in-part of application No. 09/451,926, filed on Dec. 1, 1999, now abandoned.

(30) Foreign Application Priority Data

Oct. 15, 1999 (JP) .......................................... 11-293737
May 10, 2000 (JP) ........................................ 2000-136889

(51) Int. Cl.[7] .............................................. B65D 85/57
(52) U.S. Cl. ..................... 206/751; 206/308.1; 206/759
(58) Field of Search ................... 206/303, 307, 206/308.1, 308.3, 309, 425, 751, 759, 760

(56) References Cited

U.S. PATENT DOCUMENTS

| | | | | |
|---|---|---|---|---|
| 5,586,650 A | * | 12/1996 | Yeh | 206/308.1 |
| 5,590,770 A | * | 1/1997 | Yeh | 206/308.1 |
| 5,593,031 A | * | 1/1997 | Uchida | 206/308.1 |
| 5,597,068 A | * | 1/1997 | Weisburn et al. | 206/308.1 |
| 5,617,950 A | * | 4/1997 | Chung | 206/308.1 |
| 5,662,216 A | * | 9/1997 | Nesbitt et al. | 206/308.1 |
| 5,833,062 A | * | 11/1998 | Yeh | 206/308.1 |
| 6,029,811 A | * | 2/2000 | Heiligers | 206/308.1 |
| 6,073,762 A | * | 6/2000 | Hayakawa | 206/308.1 |

* cited by examiner

*Primary Examiner*—Jim Foster
(74) *Attorney, Agent, or Firm*—Wenderoth, Lind & Ponack, L.L.P.

(57) ABSTRACT

An optical disc case permits taking out and storing an optical disc without the possibility of damage to the very important center hole of the disc while permitting conveniently taking hold of the disc and very readily taking out and storing the disc. A disc holder 7 can be held in a case body in an upwardly tilted state with its stem end located on the inner bottom surface of the case body, and it has a disc holding portion 5 for detachably holding a portion of the edge of the optical disc 2 and stopper portions 6 for preventing detachment of the disc in the direction opposite to the direction toward the stem end. In its upwardly tilted state, the disc holder holds the accommodated optical disc in a tiled state.

22 Claims, 8 Drawing Sheets

OPTICAL DISC CASE

This is a CIP application of Ser. No. 09/451,926, filed Dec. 1, 1999, now abandoned.

BACKGROUND OF THE INVENTION

1. Field of the Invention

This invention relates to optical disc cases for accommodating DVD discs, musical compact discs or computer CD-ROMs. More particularly, the invention concerns an optical disc case, which is contrived to permit reliably storing an optical disc without possibility of damage to the disc as well as permitting quickly and smoothly storing and taking out the disc.

2. Prior Art

As the prior art disc case for accommodating an optical disc, there is one, which comprises a disc holder for holding the center hole of an optical disc with an engaging boss, a case body engaging with the disc holder and a lid coupled to one side of the case body and capable of being opened and closed. This optical disc case has a simple structure and thus finds extensive applications to most commercially available musical compact discs. As a prior art disc case for accommodating a DVD disc, there is one, which has a structure that the disc holder having the engaging boss and the lid capable of being opened and closed are made integral in a hinged fashion.

For recent DVD discs and like multi-function high quality recording media, higher dimensional precision of the player and the disc is demanded than for the conventional compact discs. However, with the prior art optical disc case for protecting an accommodated optical disc, there is a possibility that, whenever the disc is brought into engagement with or detached from the engaging boss of the disc holder, the center hole periphery of the disc is damaged, if even slightly, by its rubbing with the engaging boss. When the center hole periphery of the disc is damaged, if even slightly, play is produced between it and a spindle for rotating the disc in engagement with the center hole thereof. Consequently, the disc may be rotated eccentrically or tilted relative to the intrinsic plane of rotation. This gives rise to a grave problem that the writing and reading of data to and from the disc become imperfect.

In addition, in the above prior art optical disc case, the optical disc is accommodated in close contact with the surface of the disc holder. Therefore, even by pushing as forcibly as possible the engaging boss of the disc holder which has a spring character for taking hold of the disc to be taken out, the disc is hardly floated up. Inconvenient handling is thus inevitable when taking out and storing the disc.

Furthermore, when taking out the disc, the recording surface, the touching of which should be avoided as much as possible, is often touched by fingers and damaged or contaminated.

SUMMARY OF THE INVENTION

The invention has an object of providing an optical disc case, which permits very readily taking out an optical disc from it without possibility of damage to or contamination of the recording surface of the disc as well a s permitting the take-out and storage of the disc without possibility of damage to the very important center hole of the disc.

DETAILED DESCRIPTION OF THE PREFERRED EMBODIMENTS

FIGS. 1 to 5 illustrate a first embodiment of the optical disc case according to the invention. Referring to the figures, reference numeral 1 designates the optical disc case, which is made of a synthetic resin and used for a DVD disc. The optical disc case 1 comprises a case body 3 for accommodating an optical disc 2 and a lid 4, which is made integral with one side of the case body 3 and can open and close the same from above the optical disc 2 accommodated in the case body 3. The optical disc case 1 further comprises a disc holder 7, which can be held in the case body 3 such that it projects from the case body 3 in an upwardly tilted state with its stem end 8 located on the inner bottom surface of the case body 3. The disc holder 7 has a disc holding portion 5 having an arched ridge for detachably holding an edge portion of the optical disc 2 and stopper portions 6 inwardly facing each other from ridge portions of the disc holding portion 5 at the fore end thereof such as to prevent detachment of the optical disc 2 in the direction opposite to the direction of movement toward the stem end. In its upwardly tilted state noted above, the disc holder 7 can hold the accommodated optical disc 2 in a tilted state.

Figure 4:
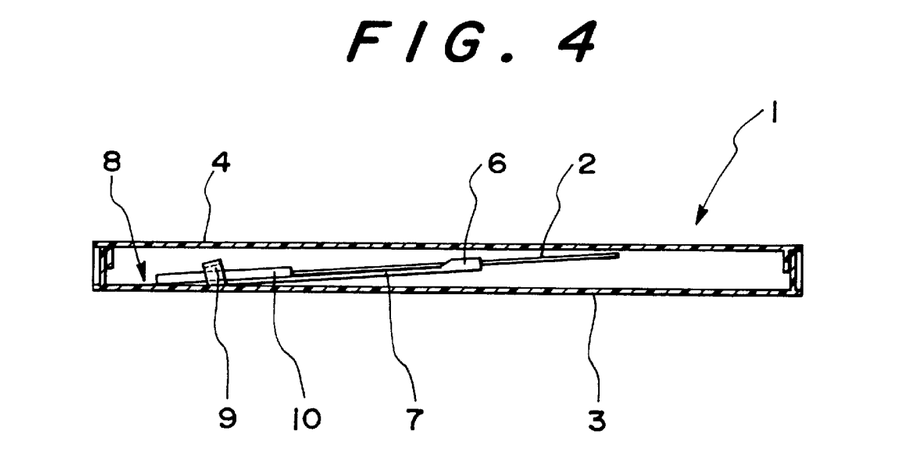
FIG. 4 is a sectional view showing the same optical disc case in a closed state thereof.

The disc holder 7 is formed together with the case body as a one-piece molding with its stem end 8 integral with the inner surface of the case body 3. The disc holder 7 is flexible so as to be biased for vertical revolution in the rising direction about the stem end 8. When the lid 4 is open, the disc holder 7 projects to be in an upwardly tilted state from the stem end 8 toward the fore end, and thus holds the accommodated optical disc in a tilted state. The disc holder 7 can project to be in an upwardly tilted state such that the center hole 2a of the optical disc 2 is located to be at least above the top of the side walls of the case body 3. As shown in FIG. 4, when the case body 3 is engaged and closed by the lid 4, the disc holder 7 is pushed down by the lid 4 and accommodated in the optical disc case 1. To restrict the upward tilt angle of the disc holder 7 to about 20 degrees permitting the optical disc 2 to be conveniently accommodated and taken out, the case body 3 has two stopper portions 9 in contact with the opposite sides of the disc holder 7 adjacent to the stem 8 thereof.

Figure 1:
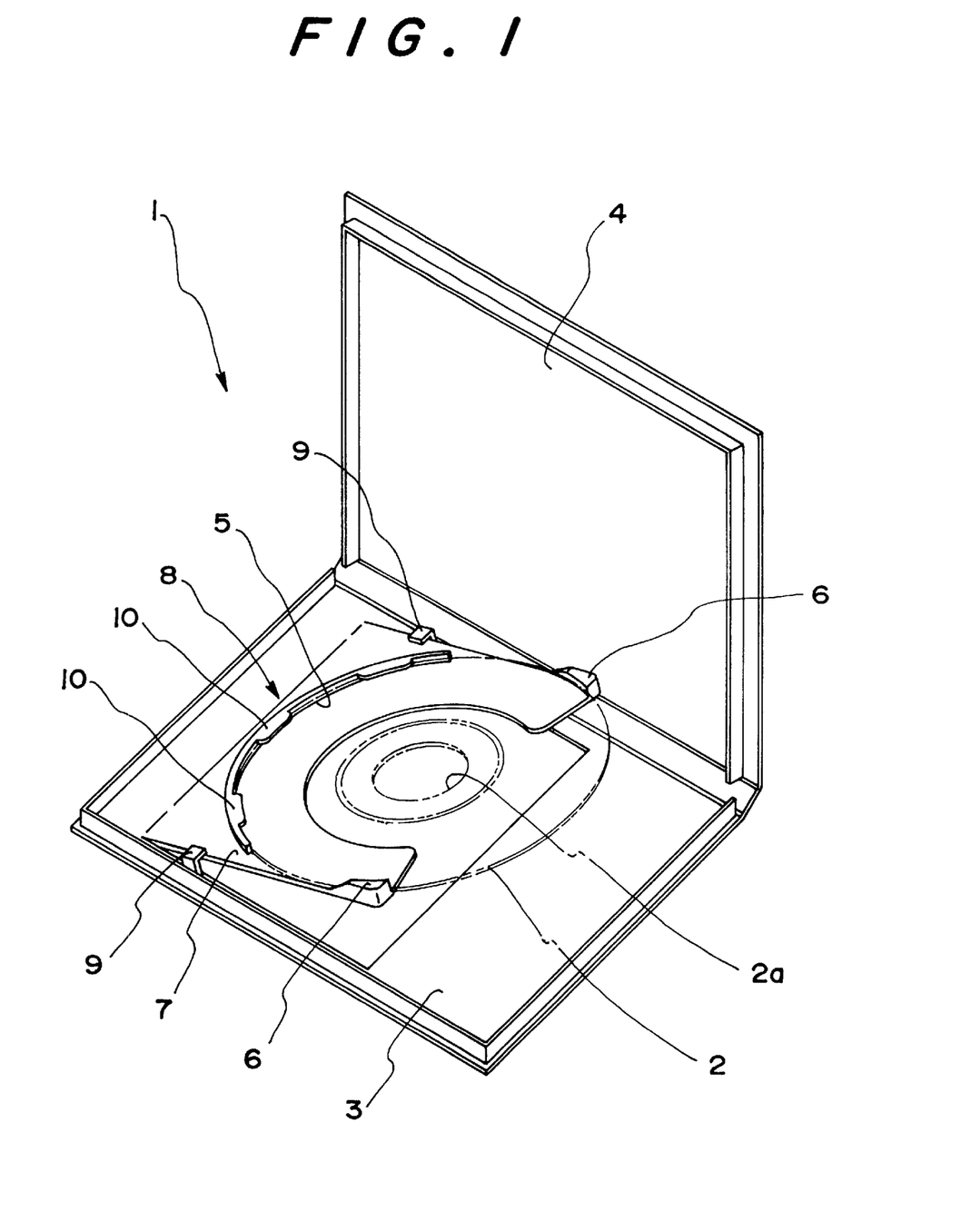
FIG. 1 is a perspective view showing a first embodiment of the optical disc case according to the invention.
Figure 2:
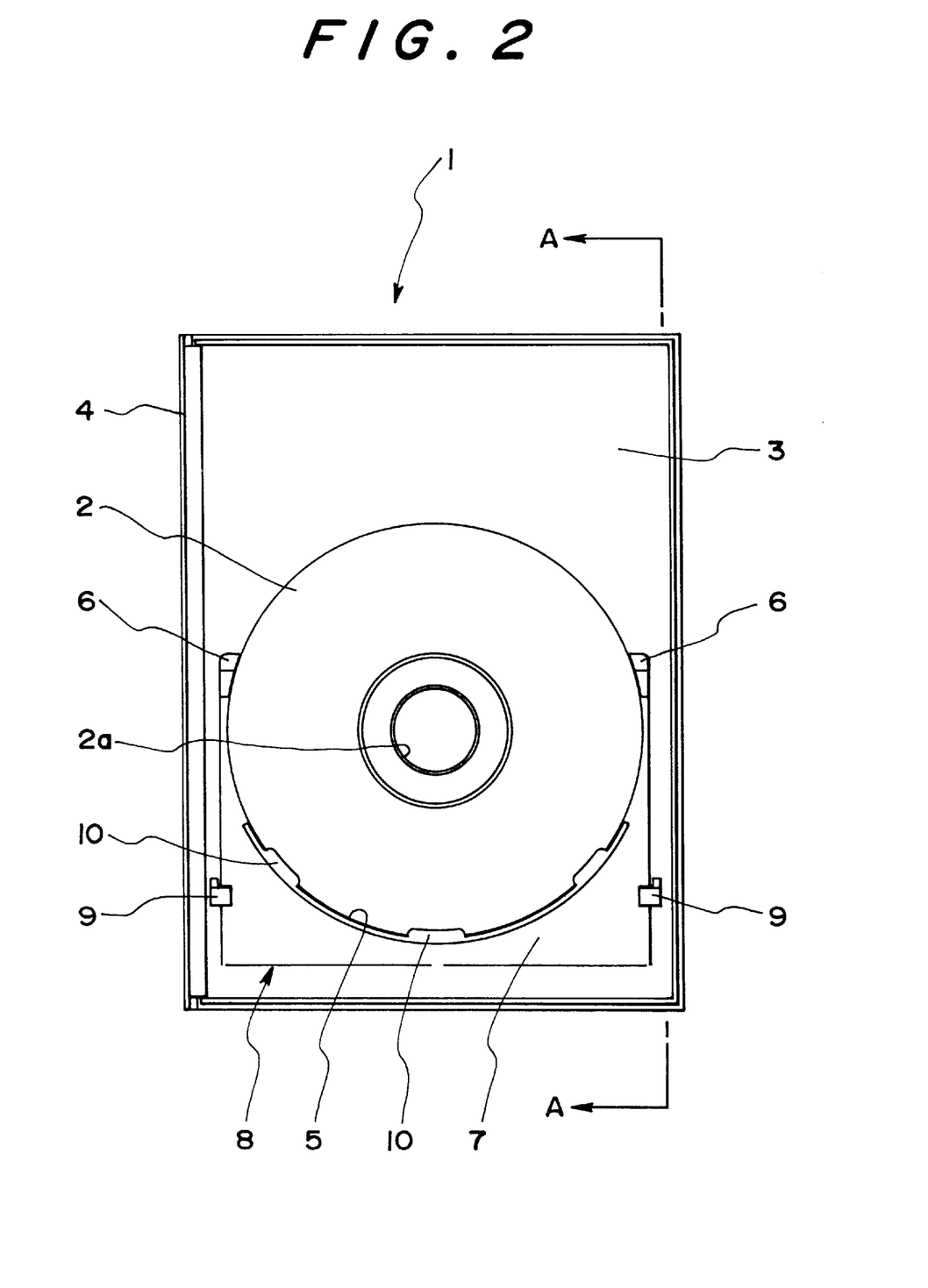
FIG. 2 is a plan view showing the same optical disc case.

As shown in FIGS. 1 and 2, the disc holding portion 5 which is formed on the top surface of the disc holder 7, has a width and a depth such that it can be in contact with and hold at least one half of the edge of the optical disc 2. Lest the recording portion of the disc 2 is touched and damaged by the bottom surface of the disc holding portion 5, an arched ridge (not shown) having a triangular sectional profile is provided on the bottom surface such as to be able to be in contact with only the edge of the disc 2 which is a non-recording portion thereof Thus, the disc holding portion 5 can be held aloof and not in contact with the disc 2. Since its central portion has nothing to do with the storing and taking out of the disc 2, the disc holding portion 5 is formed with a central notch by cutting away a large proportion of it from its fore end. The disc holding portion 5 further has three inwardly projecting retainer portions 10 formed in its portion nearer the juncture between the disc holder 7 and the case body 3. The retainer portions 10 serve to cooperate with the arched ridge for clamping the edge of the disc 2.

Figure 3:
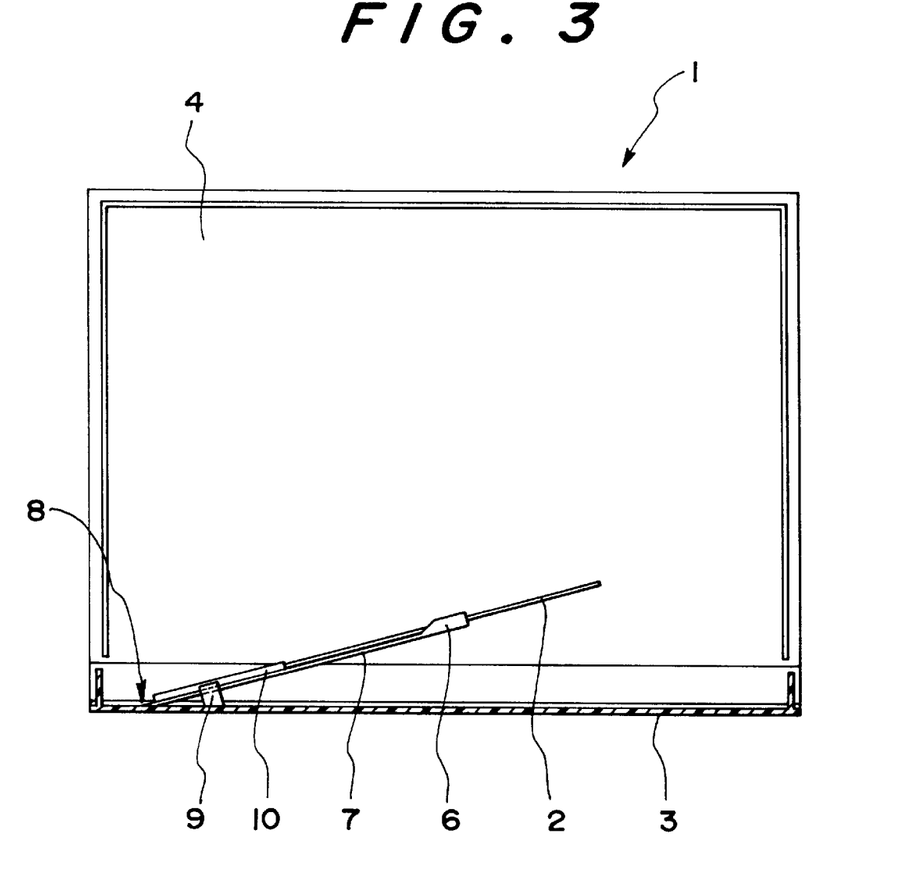
FIG. 3 is a sectional view taken along line A—A in FIG. 2.

Now, the operations of storing and taking out the optical disc 2 in and from the optical disc case 1 having the construction as described above according to the invention will be described. By opening the lid 4 of the case 1 accommodating the disc 2 in the state as shown in FIG. 4, the disc holder 7 is tilted by the biasing force of its flexible stem end 8 and brought into contact with the stopper portions 9 to be held in a state at a tilting angle of about 20 degrees as shown in FIG. 1 and 3. In this state, it is readily possible to take hold of the disc 2 between a fore end portion of the edge of the disc 2 and the center hole 2a thereof with two fingers without touching the recording surface of the disc 2. Then, by raising the fore end part of the disc 2, since the stopper portions 9 are preventing further tilting of the disc holder 7, the disc 2 can be raised such that it clears the stopper portions 6. Then, by pulling it forward, the disc 2 can be readily taken out from the disc holder 7.

The disc 2 can be stored in a manner which is converse to the above operation. Specifically, the disc 2 is held with fingers, and is then inserted into the gap between the retainer portions 10 of the disc holding portion 5 and the bottom surface of the disc holding portion 5 from above the disc holder 7 while causing its sliding along the top of the stopper portions 6. When the disc 2 has cleared the stopper portions 6, it is released. In this state, the disc 2 is engaged in the disc holding portion 5 and reliably held by the disc holder 7. By subsequently closing the lid 4, the inner surface thereof is brought into contact with and pushes the stopper portions 6 of the disc holder 7. The disc holder 7 is thus turned down, and the disc 2 is thus reliably stored in the optical disc case 1 in the state that it is held in the disc holder 7 as shown in FIG. 4. The disc 2 stored in this way remains in engagement with the disc holding portion 5 and is not detached from the disc holder 7 irrespective of inverting or turning the case 1.

Figure 5:
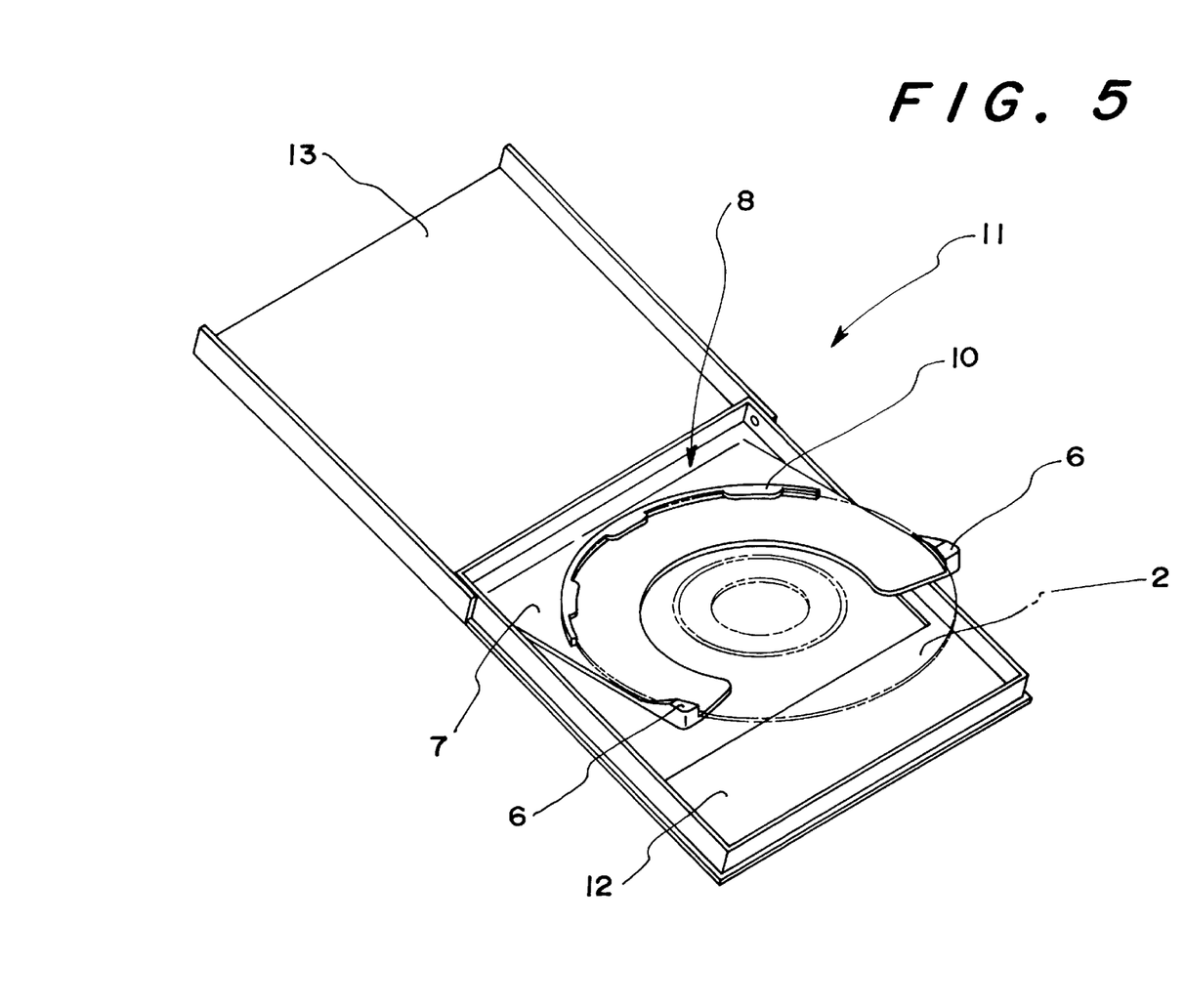
FIG. 5 is a perspective view showing a second embodiment of the optical disc case according to the invention.
Figure 6:
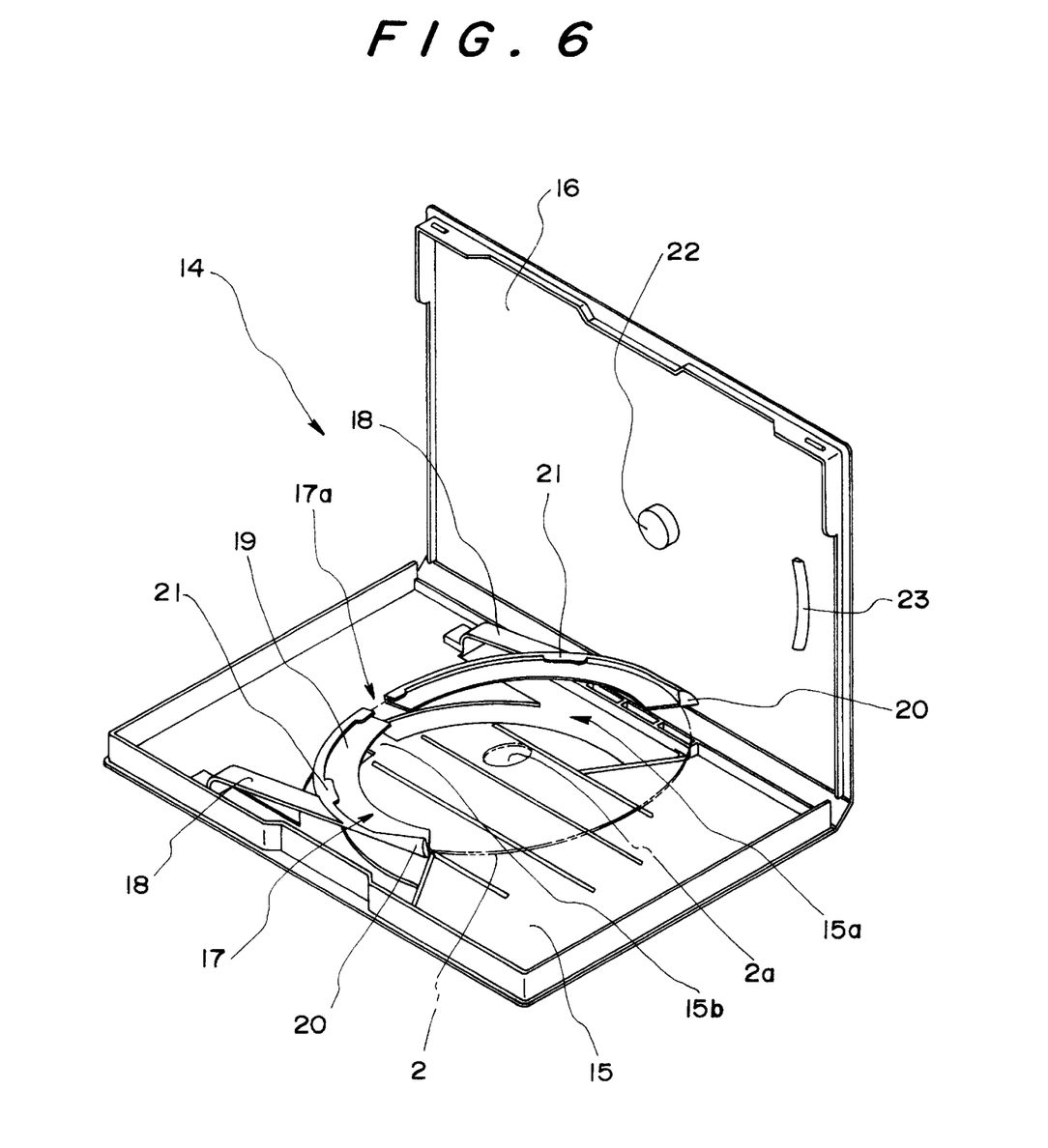
FIG. 6 is a perspective view showing a third embodiment of the optical disc case according to the invention.
Figure 7:
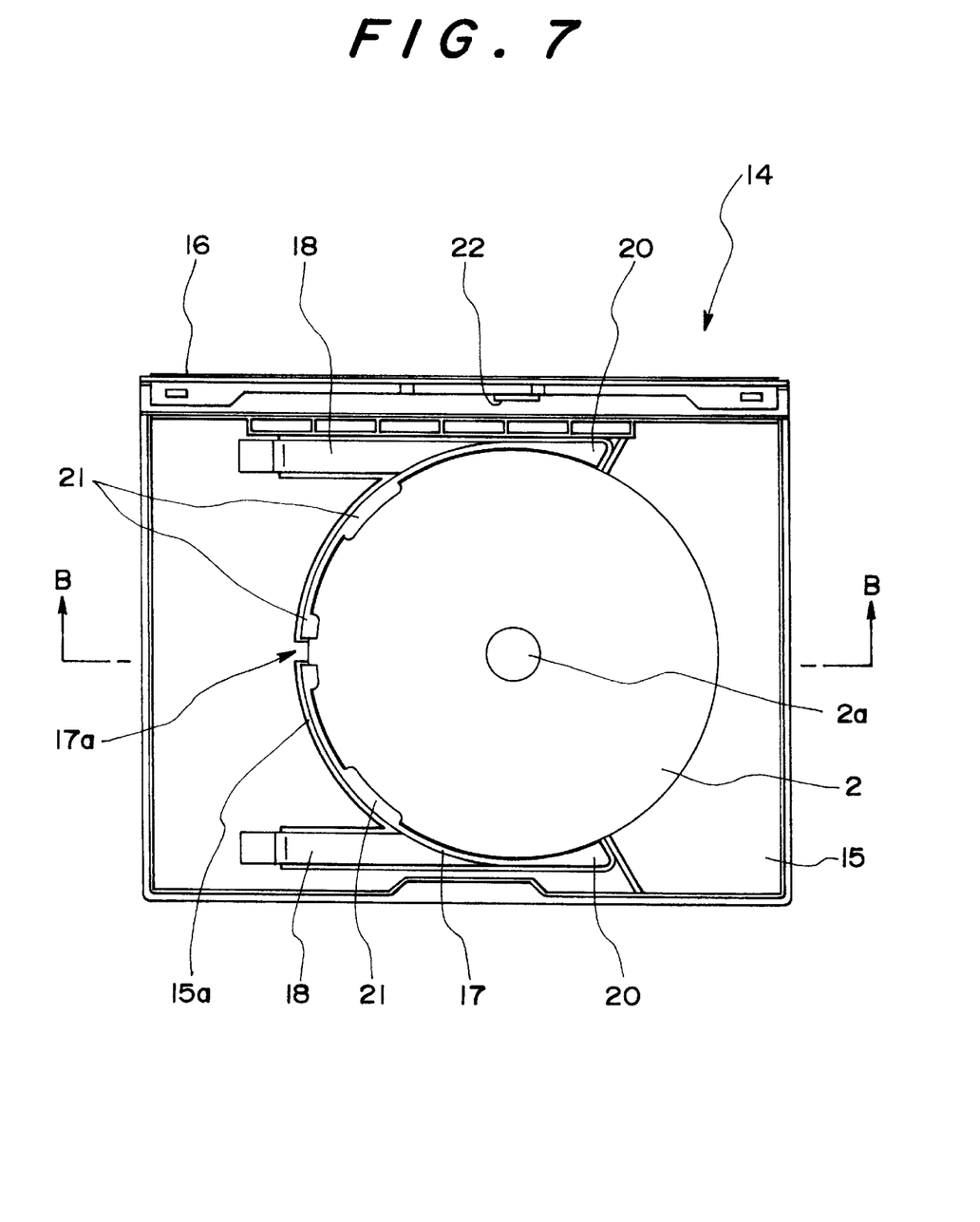
FIG. 7 is plan view showing a third embodiment of the optical disc case according to the invention.
Figure 8:
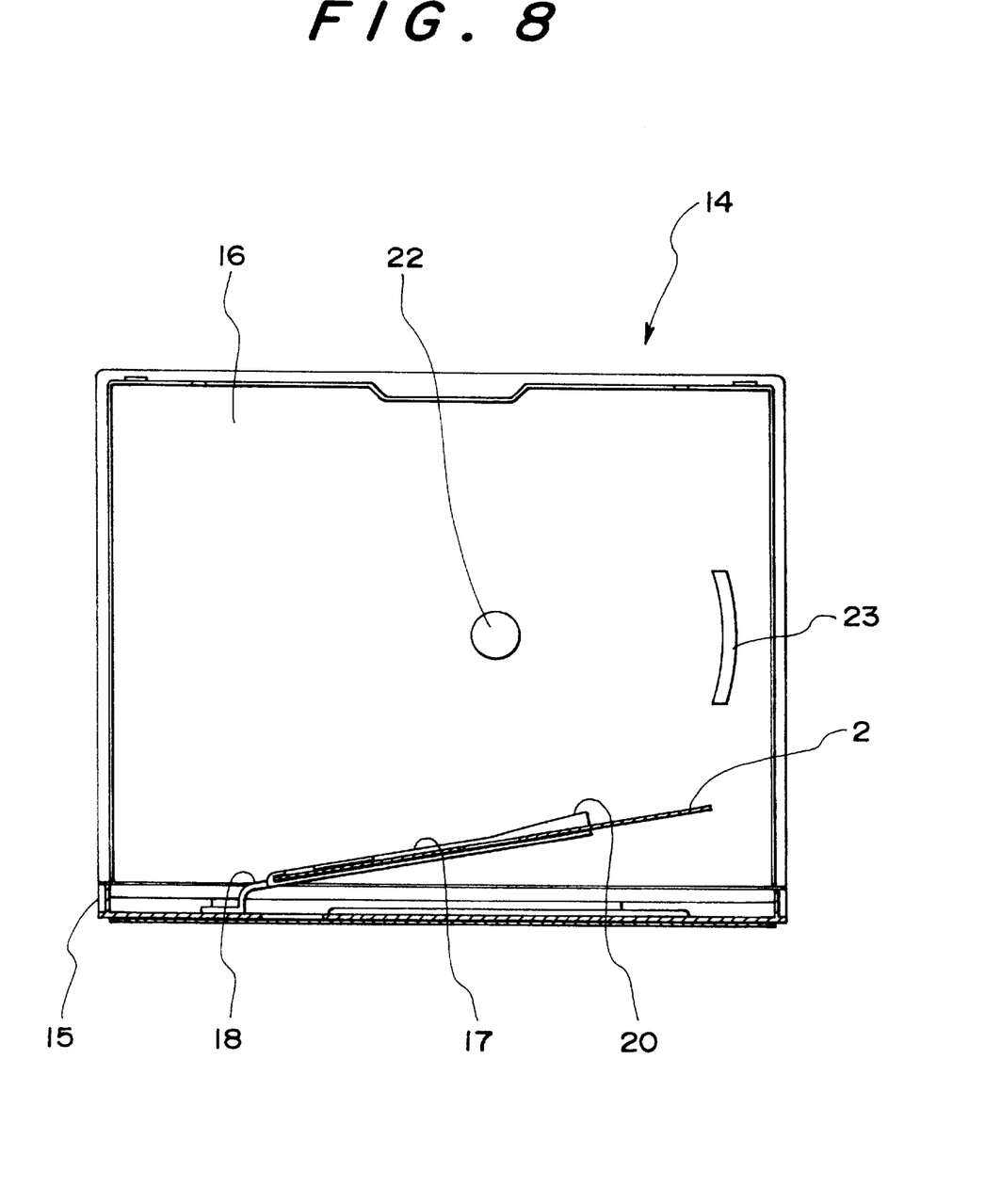
FIG. 8 is a sectional view taken along line B—B in FIG. 7.

FIG. 5 shows a second embodiment of the optical disc case according to the invention. While the above first embodiment of the optical disc case is mainly used for the DVD disc, this optical disc case 11 has substantially the same outer shape as a conventional optical disc case, which is used for musical compact discs or such optical discs as CD-ROMs for computers and comprises a disc holder and a lid. The optical disc case 11 comprises a case body 12, which a stem end 8 of a disc holder 7 for accommodating an optical disc 2 is made integral with, and a lid 13 detachably coupled to one end of the case body 12 for opening and closing the same from above the accommodated optical disc 2. At the time of opening the lid 13, the disc holder 7 can project to be in an upwardly tilted state such that the center hole 2a of the optical disc 2 held in it is located to be at least above the top of the side walls of the case body 12. The disc holder 7 thus can project in a stable state and in an ideal form, and the optical disc 2 thus can be smoothly accommodated and taken out.

This second embodiment of the optical disc case is different from the previous first embodiment in that it has substantially the same small size as the conventional optical disc case for accommodating a compact disc and that the lid 13 is detachably coupled to the end of the case body 12 nearer the stem end 8 of the disc holder 7. The disc holder 7 itself is entirely the same as that in the first embodiment.

FIGS. 6 to 9 show a third embodiment of the optical disc case according to the invention. This optical disc case 14 has a structure that it can be formed by injection molding to be a onepiece molding by using a synthetic resin material. The case also has a structure that in the closed state of its lid 16 the optical disc accommodated in it in a state held in the disc holder 17 will not be detached from the same by any shock exerted so long as the lid is held in the closed state.

The disc holder 17 is located in the case body 15 on the inner surface thereof via two arm members 18, which each have a stem end secured to the inner surface of the case body 15 and a fore end secured to each side portion of the disc holder 17 and which are each capable of projecting to be in an upwardly tilted state from the stem end toward the fore end. The arm members 18 are flexible so that they are biased in the rising direction about the stem end. The disc holder 17 thus can project to be in an upwardly tilted state from the stem end toward the fore end, so that the accommodated optical disc 2 is held in a tilted state.

Since the disc holder 17 is formed to be integral with the case body 15, it has a substantially arched notch 15a corresponding in form to the disc holder 17 and the arm members 18 raised from the case body 15. In order to prevent the case body 15 from being readily flexible in a bifurcated state due to the formation of the notch 15a, a coupling portion 15b is formed in a central part of the notch 15a. With the formation of the coupling portion 15b, a central portion of the disc holder 17 is formed with a notch 17a corresponding to the width of the coupling portion 15b.

Like the previous first and second embodiments, the disc holder 17 includes a disc holding portion 19 for detachably holding the edge of the optical disc 2, stopper portions 20 projecting from the disc holding portion 19 such as to prevent the detachment of the optical disc 2 in the direction toward the fore end, and retainers 21 for clamping the edge of the optical disc 2.

Figure 9:
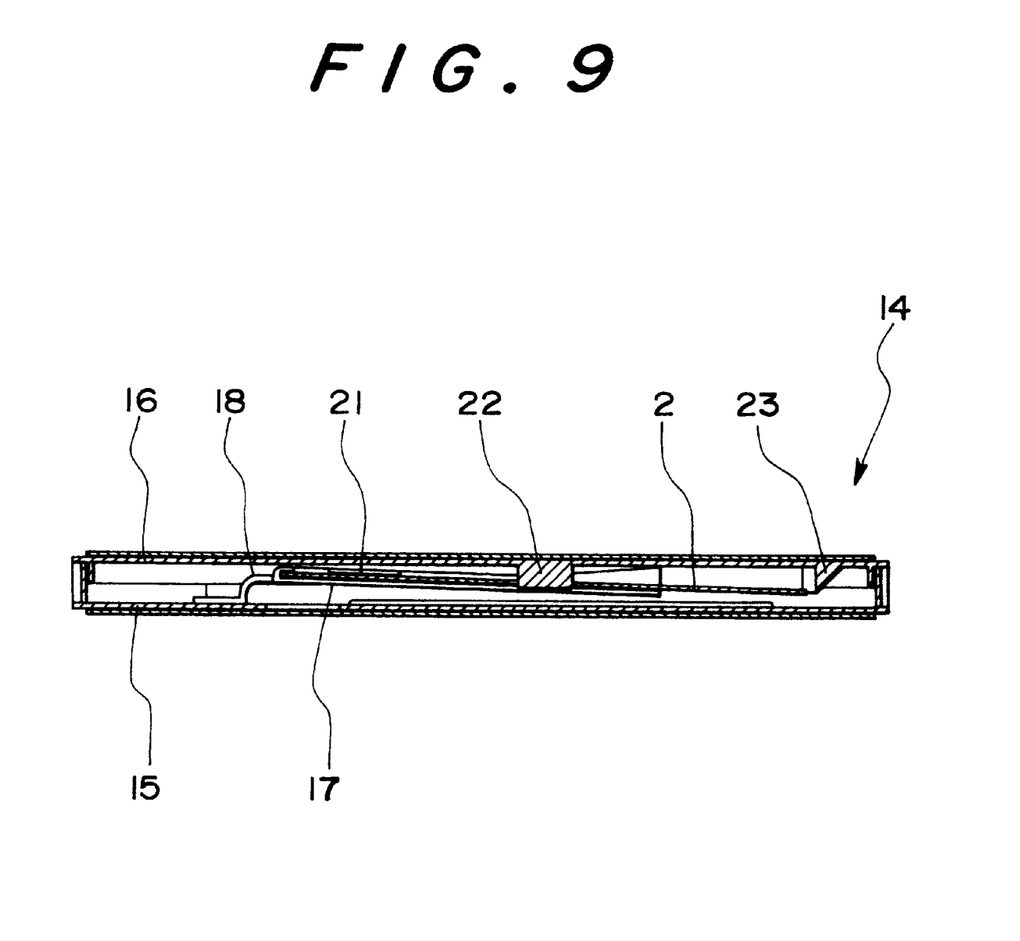
FIG. 9 is a sectional view showing the optical disc case shown in FIG. 8 with the lid in the closed state.

Furthermore, as shown in FIG. 9, the inner surface of the lid 16 has a substantially cylindrical integral optical disc center hole hook member 22, on which the center hole 2a of the optical disc 2 can be fitted not in contact with it but loosely when the lid 16 is closed. Also, the inner surface of the lid 16 has a substantially arched integral optical disc detachment prevention ridge 23, which is located, when the case body 15 is closed by the lid 16, to be in the close proximity of an edge portion of the optical disc 2 held in the disc holder 17 on the side of the optical disc 2 opposite the fore end side, so that it can reliably prevent detachment of the optical disc 2 in the direction thereof toward the fore end.

While the above embodiments concerned with the structure that the disc holder 7 is capable of being tilted relative to the case body, this is by no means limiting. For example, although not shown, it is possible to set the disc holder 7 in a fixed tilted state in the case body as shown in FIG. 4. An optical disc which is accommodated in such a slightly tilted state, can be easily taken hold of and permits readily taking out and storing it in comparison with the conventional optical disc case.

While the first and third embodiments concerned with the structure that the disc holder 7 and the case body are made integral with each other, this is by no means limiting. For example, it is possible to provide the case body with an integral elastic hinge structure and mount the disc holder on this structure.

Furthermore, while the above first and third embodiments were described in connection with the construction that the case body and the lid are formed as a one-piece molding of a synthetic resin material, like the second embodiment it is also possible to form the case body and the lid separately so that the lid is detachable.

As has been described in the foregoing, it is readily possible to take out and store the disc without the possibility of causing damage to the very important center hole of the disc and thus improve the reliability thereof. It is also possible to conveniently take hold of the disc and very readily take out and store the disc without the possibility of damaging or contaminating the recording surface of the disc. The optical disc case according to the invention thus does not only have the conventional function of projecting and packing an optical disc, but also is greatly convenient in use when taking out and storing the disc.

In addition, the disc holder is capable of being upwardly tilted and turned down with its stem end located on the inner bottom surface of a case body as a fulcrum, and is also biased for upward tilting. Thus, by opening the lid the disc holder is tilted up to an adequate angle for readily taking out or storing the optical disc, while by closing the lid it is turned down so that the disc can be compactly stored.

Moreover, the disc holding portion has retainer portions formed on its ridge portion on the stem end side such as to prevent detachment of the accommodated optical disc upwardly and also in the direction of movement toward the stem end of the disc holder. The accommodated disc thus can remain in the case without being moved and in a reliable held state irrespective of inverting or turning the case.

Yet further, the case body provided with the disc holder and the lid for opening and closing the case body are formed as a one-piece molding of a synthetic resin. The lid thus can be readily opened and closed by one-touch operation. In addition, it is possible to greatly reduce the number of steps necessary for the manufacture of the optical disc case.

Further, the disc holder can project to be in an upwardly tilted state such that the center hole of the optical disc held in the disc holder is located to be at least above the top of the side walls of the case body. Thus, the optical disc can be readily accommodated and taken out without need of touching the case body with fingers taking hold of the optical disc.

Further, the disc holder is located in the case body on the inner surface thereof via the two arm members, which each have the stem end secured to the inner surface of the case body and the fore end secured to each side portion of the disc holder and which are each capable of projecting to be in an upwardly tilted state from the stem end toward the fore end. In other words, the disc holder is not directly connected to and secured to the case body inner surface. Thus, the disc holder can always project to be in a stable state and in an ideal form, and the optical disc thus can be smoothly accommodated and taken out.

Further, the inner surface of the lid has the optical disc center hole hook member, on which the center hole of the optical disc held in the disc holder can be fitted not in contact with it but loosely when the lid is closed. Thus, when the lid is closed with the optical disc held in the disc holder, the center hole of the optical disc can be held hooked on the optical disc center hole hook ridge to prevent detachment of the optical disc when great shock is exerted to the case body.

Further, the inner surface of the lid has the optical disc detachment prevention ridge, which is located, when the lid is closed, to be in the close proximity of the edge portion of the optical disc held in the disc holder on the side of the optical disc opposite the fore end side. Thus, when the lid is closed with the optical disc held in the disc holder, the optical disc will not be detached with its fore end side edge portion in contact with the optical disc detachment preventing ridge when great shock is exerted to the case body unless the lid is open.

Further, by opening the lid the disc holder projects to be in an upwardly tilted state such that the center hole of the optical disc held in the disc holder is located to be at least above the top of the side walls of the case body. Thus, in this state the optical disc can be readily accommodated and taken out without need of touching the case body with the fingers taking hold of the optical disc.

What is claimed is:

1. An optical disc case comprising a case body and a disc holder capable of being held in the case body so as to project therefrom in an upwardly tilted state with a stem end located on the inner bottom surface of the case body to hold an accommodated optical disc in a tilted state, the disc holder having a disc holding portion having an arched ridge for detachably holding an edge portion of the optical disc and stopper portions inwardly facing each other from ridge portions of the disc holding portion so as to prevent detachment of the optical disc in the direction opposite to the direction of movement toward the stem end, wherein the disc holder is flexible and capable of flexing about its stem end and secured to an inner surface of the case body.

2. The optical disc case according to claim 1, wherein the optical disc holder is capable of being upwardly tilted and returned with its stem end located on an inner bottom surface of the case body as a fulcrum and biased for upward tilting.

3. The optical disc case according to claim 1, wherein the disc holder is capable of projecting from the case body into an upwardly tilted state with its stem end secured to an inner bottom surface of the case body.

4. The optical disc case according to claim 1, wherein the disc holding portion has at least one retainer portion formed on its ridge portion nearer its stem end so as to prevent detachment of the accommodated optical disc upwardly and also in the direction of movement toward the stem end of the disc holder.

5. The optical disc case according to claim 1, wherein the stopper portions are provided on an end portion of the disc holder.

6. The optical disc case according to claim 1, wherein the disc holder is capable of being held in the case body so as to project to be in an upwardly tilted state such that a center hole of the optical disc held in the disc holder is located at a position at least above the top of side walls of the case body.

7. The optical disc case according to claim 1, wherein the case body and a lid capable of opening and closing the case body are formed as an integral member from a synthetic resin material.

8. An optical disc case comprising a case body and a disc holder capable of being held in the case body so as to project therefrom in an upwardly tilted state with a stem end located on the inner bottom surface of the case body to hold an accommodated optical disc in a tilted state, the disc holder having a disc holding portion having an arched ridge for detachably holding an edge portion of the optical disc and stopper portions inwardly facing each other from ridge portions of the disc holding portion so as to prevent detachment of the optical disc in the direction opposite to the direction of movement toward the stem end, wherein the case body having the disc holder and a lid capable of opening and closing the case body are formed as an integral member from a synthetic resin material, and wherein the inner surface of the lid has an optical disc center hole hook member, on which a center hole of the optical disc held in the disc holder can be fitted not in contact with it but loosely when the lid is closed, so that the optical disc can be held reliably without possibility of detaching from the disc holder.

9. The optical disc case according to claim 8, wherein at the time of opening the lid the disc holder projects in an upwardly tilted state such that the center hole of the optical disc held in the disc holder is located to be at least above the top of side walls of the case body.

10. The optical disc case according to claim 8, wherein the disc holding portion has at least one retainer portion formed on its ridge portion nearer its stem end so as to prevent detachment of the accommodated optical disc upwardly and also in the direction of movement toward the stem end of the disc holder.

11. The optical disc case according to claim 8, wherein the stopper portions are provided on an end portion of the disc holder.

12. An optical disc case comprising a case body and a disc holder capable of being held in the case body so as to project therefrom in an upwardly tilted state with a stem end located on the inner bottom surface of the case body to hold an accommodated optical disc in a tilted state, the disc holder having a disc holding portion having an arched ridge for detachably holding an edge portion of the optical disc and stopper portions inwardly facing each other from ridge portions of the disc holding portion so as to prevent detachment of the optical disc in the direction opposite to the direction of movement toward the stem end, wherein the case body having the disc holder and a lid capable of opening and closing the case body are formed as an integral member from a synthetic resin material, and wherein an inner surface of the lid has an optical disc detachment prevention ridge member, which is located, when the lid is closed, to be in close proximity of an edge portion of the optical disc held in the disc holder on the side of the optical disc opposite the fore end side, so that the optical disc detachment prevention ridge can reliably prevent detachment of the optical disc in the direction thereof toward the fore end.

13. The optical disc case according to claim 12, wherein the disc holding portion has at least one retainer portion formed on its ridge portion nearer its stem end so as to prevent detachment of the accommodated optical disc upwardly and also in the direction of movement toward the stem end of the disc holder.

14. The optical disc case according to claim 12, wherein at the time of opening the lid the disc holder projects in an upwardly tilted state such that the center hole of the optical disc held in the disc holder is located to be at least above the top of side walls of the case body.

15. The optical disc case according to claim 12, wherein the stopper portions are provided on an end portion of the disc holder.

16. An optical disc case comprising a case body and a disc holder capable of being held in the case body so as to project therefrom in an upwardly tilted state with a stem end located on the inner bottom surface of the case body to hold an accommodated optical disc in a tilted state, the disc holder having a disc holding portion having an arched ridge for detachably holding an edge portion of the optical disc and stopper portions inwardly facing each other from ridge portions of the disc holding portion so as to prevent detachment of the optical disc in the direction opposite to the direction of movement toward the stem end, wherein the disc holder is located in the case body via two arm members, which respectively have stem ends and are secured to the inner surface of the case body and fore ends respectively secured to side portions of the disc holder, the arm members being capable of projecting to be in an upwardly tilted state from the stem ends thereof toward the fore ends thereof, and wherein the arm members supporting the disc holder are flexible and permit flexing of the supported disc holder.

17. The optical disc case according to claim 16, wherein the disc holding portion has at least one retainer portion formed on its ridge portion nearer its stem end so as to prevent detachment of the accommodated optical disc upwardly and also in the direction of movement toward the stem end of the disc holder.

18. The optical disc case according to claim 16, wherein the case body and a lid capable of opening and closing the case body are formed as an integral member from a synthetic resin material.

19. The optical disc case according to claim 16, wherein the disc holder is capable of being held in the case body so as to project to be in an upwardly tilted state such that a center hole of the optical disc held in the disc holder is located at a position at lest above the top of side walls of the case body.

20. The optical disc case according to claim 16, wherein the inner surface of the lid has an optical disc center hole hook member, on which a center hole of the optical disc held in the disc holder can be fitted not in contact with it but loosely when the lid is closed, so that the optical disc can be held reliably without possibility of detaching from the disc holder.

21. The optical disc case according to claim 16, wherein an inner surface of the lid has an optical disc detachment prevention ridge member, which is located, when the lid is closed, to be in close proximity of an edge portion of the optical disc held in the disc holder on the side of the optical disc opposite the fore end side, so that the optical disc detachment prevention ridge can reliably prevent detachment of the optical disc in the direction thereof toward the fore end.

22. The optical disc case according to claim 16, wherein the stopper portions are provided on an end portion of the disc holder.

* * * * *